US008167217B2

(12) United States Patent
Lhuillier (10) Patent No.: US 8,167,217 B2
(45) Date of Patent: May 1, 2012

(54) RAPID-RESPONSE THERMOSTATIC ELEMENT AS WELL AS A CARTRIDGE AND VALVE THAT ARE EQUIPPED WITH THIS ELEMENT

(75) Inventor: Philippe Lhuillier, Breuillet (FR)

(73) Assignee: Vernet, Ollainville (FR)

( * ) Notice: Subject to any disclaimer, the term of this patent is extended or adjusted under 35 U.S.C. 154(b) by 652 days.

(21) Appl. No.: 11/919,251

(22) PCT Filed: Apr. 26, 2006

(86) PCT No.: PCT/FR2006/000932
§ 371 (c)(1),
(2), (4) Date: Oct. 25, 2007

(87) PCT Pub. No.: WO2006/114522
PCT Pub. Date: Nov. 2, 2006

(65) Prior Publication Data
US 2009/0272816 A1 Nov. 5, 2009

(30) Foreign Application Priority Data
Apr. 27, 2005 (FR) ...................................... 05 04241

(51) Int. Cl.
*G05D 23/02* (2006.01)
*G05D 23/13* (2006.01)
(52) U.S. Cl. ...... 236/100; 236/12.11; 236/86; 236/93 A; 236/99 K; 236/99 R (58) Field of Classification Search ................ 236/86, 236/93 A, 99 K, 99 R, 100
See application file for complete search history.

(56) References Cited

U.S. PATENT DOCUMENTS

| 5,052,181 | A | | 10/1991 | Asada et al. |
| 5,364,889 | A | * | 11/1994 | Quinn et al. ................ 522/71 |
| 5,590,428 | A | * | 1/1997 | Roter ............................. 5/726 |
| 6,378,776 | B1 | * | 4/2002 | Chamot et al. ............. 236/100 |
| 2004/0221503 | A1 | * | 11/2004 | Murphy et al. ................ 44/275 |

FOREIGN PATENT DOCUMENTS

| EP | 0153 555 | 1/1985 |
| FR | 2 699 230 | 6/1994 |
| GB | 1 385 372 A | 2/1975 |
| JP | 61 061953 | 3/1986 |

OTHER PUBLICATIONS

Abstracts of Japen vol. 010 No. 227 (M-505), Aug. 7, 1986.

* cited by examiner

*Primary Examiner* — Cheryl J Tyler
*Assistant Examiner* — Jonathan Bradford
(74) *Attorney, Agent, or Firm* — Dowell & Dowell, PC (57) ABSTRACT

A thermostatic element includes a metal cup that contains a material, which can expand and contract according to variation in its temperature, and is provided on an inside thereof with an insert that separates its inside volume ($V_1$) into at least two cavities for storing the material. The thermostatic element also includes a piston which is axially reciprocally movable relative to the cup depending on whether the material expands or contracts. The insert includes at least one opening there through for enabling passage of the material between the at least two cavities.

15 Claims, 5 Drawing Sheets

RAPID-RESPONSE THERMOSTATIC ELEMENT AS WELL AS A CARTRIDGE AND VALVE THAT ARE EQUIPPED WITH THIS ELEMENT

BACKGROUND OF THE INVENTION

1. Field of the Invention

The present invention relates to a thermostatic element of the type comprising an outer metal cup of elongated shape, containing a material that is notably expandable and contractile according to the direction of variation of its temperature, and a piston that can move relative to the cup in the longitudinal direction of the latter and is coupled to the expandable and contractile material so as to move in opposite directions depending on whether the material expands or contracts. The invention also relates to a thermostatic cartridge and faucet, fitted with such an element.

2. Brief Description of the Related Art

Such thermostatic elements are used in particular in the field of the temperature adjustment of a fluid originating from the mixing of two streams of fluid at different temperatures, the relative movement of the piston and of the cup being applied to modify the proportion of the mixing of the two streams of fluid. This is particularly the case in mixer faucet cartridges and in mixer faucets.

For a large number of applications in this field, it is necessary for the response of the thermostatic element to be extremely rapid, that is to say that the change of temperature of the environment in which the cup is formed very quickly causes a corresponding movement of the piston. This is particularly the case for thermostatic elements immersed in a stream of water supplying a sanitary installation, an application for which, an ideal temperature being selected, a drop in temperature of only three or four degrees is very unpleasant, and an increase of a few degrees may cause scalds.

Figure 1:
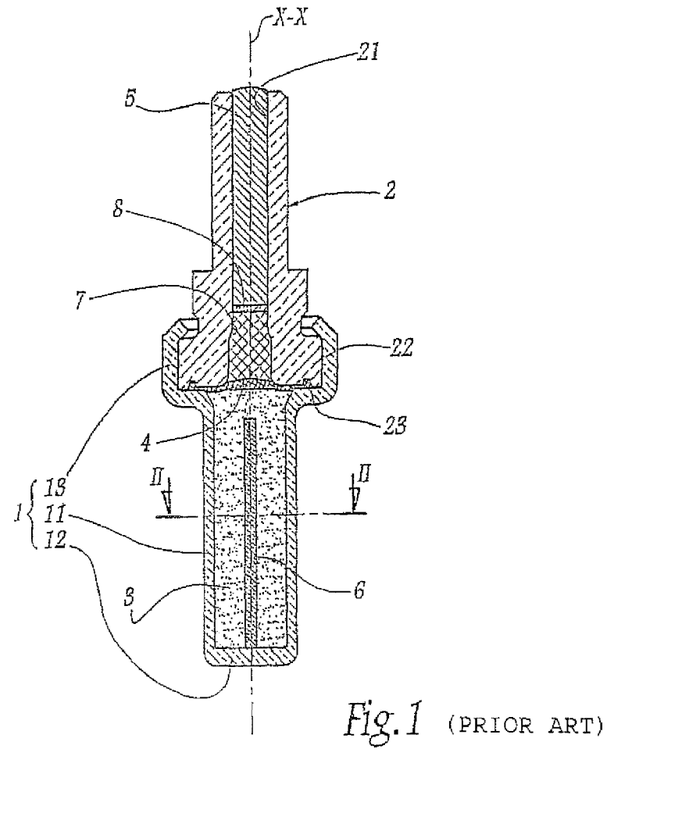
FIG. 1 is a longitudinal section of a known thermostatic element that has been described above.
Figure 2:
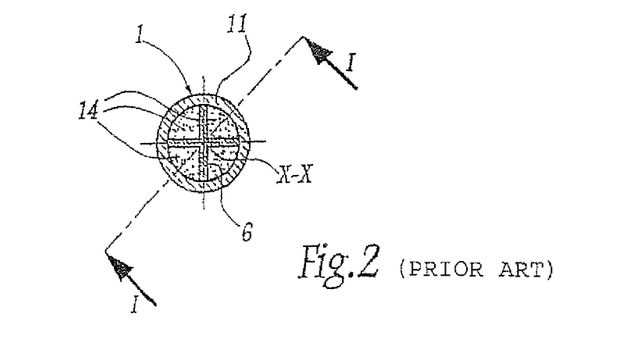
FIG. 2 is a cross section of the element of FIG. 1 along the plane II-II of this figure, the plane I-I indicated in FIG. 2 corresponding to the sectional plane of FIG. 1.

The thermostatic elements conventionally used in this type of application comprise, for example in accordance with FIGS. 1 and 2, a metal cup 1 having a tubular unsupported portion 11 having a generally cylindrical shape with a circular base and a longitudinal axis X-X. A bottom end 12 closes this portion 11 while the opposite end spreads out to connect to a collar 13. A sheath 2, having a shape of revolution with a central channel 21, comprises a base 22 housed in the collar of the cup so that, except for the base 22, the sheath 2 extends outside the cup in the direction opposite to the cylindrical portion 11 of the latter, and coaxially. The collar 13 is swaged around the base 22.

The tubular portion 11 of the cup is filled with a mass of material that is extremely expandable and contractile according to the temperature variations, particularly around a functional temperature, here a mass of wax 3. The base 22 of the sheath comprises in its face that is opposite to this mass of wax, an annular housing 23 in which is anchored the periphery of a diaphragm 4 that is disk-shaped and elastically deformable, closing off the central channel 21 of the sheath on the side of the cup 1. Inside the channel 21 of the sheath, a piston 5 is housed that is subjected to the movements of the central region of the diaphragm by means of a pad 7 made of deformable elastomer in contact against the surface of the diaphragm opposite to the wax and a shim 8 made of polymer such as PTFE inserted between the pad and the piston and adjusted in the channel 21 to prevent the elastomer of the pad creeping around the piston. The end of the piston 5 opposite to the diaphragm 4 protrudes more or less from the sheath depending on the volume occupied by the wax, therefore on the temperature of the latter.

The general design of these thermostatic elements is well-suited to the use of a wax whose expansion coefficient is extremely high relative to that of the common fluids (approximately 10 to 20 times greater) and therefore capable of causing a very ample movement of the piston. Unfortunately, these waxes have a very low heat conductibility (approximately 1000 times less than that of copper), and therefore the temperature of the entire mass of wax only imperfectly and with a long delay reflects that of the fluid in which the cup is immersed. For this reason, the wax is usually "filled" with a powder made of a material having a good heat conductibility, for example a copper powder of appropriate particle size. For simplification, in the following description, the filled materials and the unfilled materials and the single-component waxes will all be called "wax". However, all these artifices are insufficient to obtain a rapid-response thermostatic element that can be used without particular precaution in a sanitary installation.

To remedy this disadvantage in particular, it has been proposed, particularly in EP-A-0 153 555, to fit, inside the cup of the thermostatic element, a metal insert in contact with the inner face of the cup, as shown in FIGS. 1 and 2 in which this insert has reference number 6. This insert has, in cross section as in FIG. 2, a cross-shaped solid section whose four branches extend from the central zone of the thermostatic element to the tubular wall 11 of the cup 1. Along the axis X-X, the insert 6 extends over almost the whole length of the cup 1, its end opposite to the piston 5 being in contact with the bottom wall 12 of the cup. The insert 6 therefore divides the majority of the inner volume of the cup 1 into four distinct blind cavities 14 distributed about the axis X-X and all opening onto the diaphragm 4. The majority of the wax 3 is stored in these cavities, the rest of the wax being axially interposed between the diaphragm and the outlets of the cavities. In this manner, the heat of the tubular wall 11 and bottom wall 12 of the cup 1 is transmitted more rapidly to the inner metal insert 6 than to the wax 3, the latter then being heated by the insert in addition to its being heated by the walls of the cup.

The response time of this thermostatic element is therefore markedly improved. On the other hand, during the cooling phases of this thermostatic element, during which the wax 3 contracts, the wax may have difficulties in re-entering the cavities 14 of the cup 1 under the action of the piston 5 during retraction, because of the small cross section of the outlets of these cavities, through which the wax must withdraw toward the bottom wall 12 of the cup, leaving sufficient space for the retraction of the piston. These wax flow difficulties at the outlets of the cavities 14 are all the more marked when these cavities have a considerable depth, as is the case for a cup that is called "long", that is to say a cup of the type of FIGS. 1 and 2, whose axial dimension is substantially greater than its diameter in order to increase the surface area of heat exchange between the wax and the inner face of the cup. In practice, the potential causes of these wax flow difficulties are particularly linked:

to a lack of homogeneity of the wax 3, in particular when the latter is filled with a heat-conducting powder, as mentioned above, since, after many cycles of expansion and contraction of this wax, the proportion of the conducting powder tends to increase in certain zones, which has the effect of locally increasing the viscosity of the filled wax, and/or to dimensional differences of the cross sections of the various cavities 14, resulting from the design of the cup 1 and/or of the metal insert 6, and/or resulting from inaccuracies of assembly of this insert during the manufacture of the thermostatic element.

Whatever is the cause thereof, the difficulty of flow of the wax 3 in one of the cavities 14 accentuates the hysteresis of the behaviors of the thermostatic element when it is heated and cooled since the piston 5 is slowed, and even stopped during its retraction for a temperature of actuation of the thermostatic element that is higher than that at which the piston should in principle stop its retraction travel, which results in decalibrating the thermostatic element.

SUMMARY OF THE INVENTION

The object of the present invention is to propose a rapid-response thermostatic element that is more reliable and whose behavior cycles are more stable over time.

Accordingly, the subject of the invention is a thermostatic element as defined in claim 1.

With the thermostatic element according to the invention, the expandable and contractile material may pass from one of the cavities delimited inside the cup to another of these cavities, via the through-opening(s), in the portion of the cup opposite to the piston. In other words, this material may flow from one cavity to the other in at least one other location than at the zone of material lying between the retractable end of the piston and the means of dividing the thermostatic element. Accordingly, even if, during a cooling phase of this thermostatic element, the expandable and contractile material has difficulties penetrating, under the effect of the pressure generated by the load of the piston during retraction, one of the cavities at the outlet of this cavity turned toward the piston, this cavity may then be filled by the expandable and contractile material originating from one or more of the adjacent cavities, passing through the through-openings delimited by the dividing means. The difference in the behaviors of the thermostatic element during its heating and its cooling is therefore constant during its operating cycles, since the risks that one of the cavities for storing the expandable and contractile material is totally isolated from the other cavities are low, which prevents the piston, during its retraction, from being stopped at a height greater than that at which it should in principle stabilize during the cooling of the thermostatic element. Relative to the thermostatic element referred to in FIGS. 1 and 2, the reliability and the life expectancy of the thermostatic element according to the invention are significantly improved.

Other features of this thermostatic element, taken in isolation or in all the technically possible combinations, are explained in dependent claims 2 to 12.

A further subject of the invention is a thermostatic cartridge, and a thermostatic faucet, furnished with a thermostatic element as defined above.

BRIEF DESCRIPTION OF THE DRAWINGS

The invention will be better understood on reading the following description, given only as an example and made with reference to the drawings in which.

DESCRIPTION OF THE PREFERRED EMBODIMENTS

The known thermostatic element of FIGS. 1 and 2 having been described above, it will not be described again in detail here. For convenience, the members of the thermostatic elements according to the invention that correspond to members of the known element bear the same reference numbers.

Like the known thermostatic element, the various thermostatic elements represented in FIGS. 3 to 5, 8 to 11 and 13 are designed to be fitted to a faucet cartridge or a thermostatic faucet and comprise:

- a metal cup 1 extending along a central axis X-X, having a tubular unsupported wall 11 filled with a mass of essentially expandable and contractile material 3, such as wax, and furnished, at one end, with a closed transverse bottom wall 12 while the opposite end spreads out to be connected to a collar 13.
- a sheath 2 having a shape of revolution with a central channel 21 and a base 22 housed in the collar of the cup, the collar 13 being swaged about the base 22, and the cup and the sheath extending coaxially along the axis X-X in opposite directions,
- an elastically deformable diaphragm 4 and a piston 5 subjected to the movement of the central region of this diaphragm by means of a pad 7, with interposition of a shim 8, these components not being explained in detail here again since they have been explained previously with respect to FIGS. 1 and 2, and
- a metal insert 9 that is explained in detail below.

Turning now to the differences relative to the element of FIGS. 1 and 2, and considering in greater detail the embodiment of FIGS. 3 to 8, the insert 9 consists of two flat metal plates 91 that are identical to one another. As shown in greater detail in FIGS. 6 and 7, each plate 91 has a generally thin parallelepipedal shape and has a plane of symmetry P extending along the plane that is both the mid-plane to the plate and parallel to the lateral sides 91A of the plate, it being agreed that the lateral sides are the longest opposite sides of the plate seen from the front, while the other two opposite sides 91B are hereinafter designated as being the front sides of the plate.

Figures 6, 7, 8:
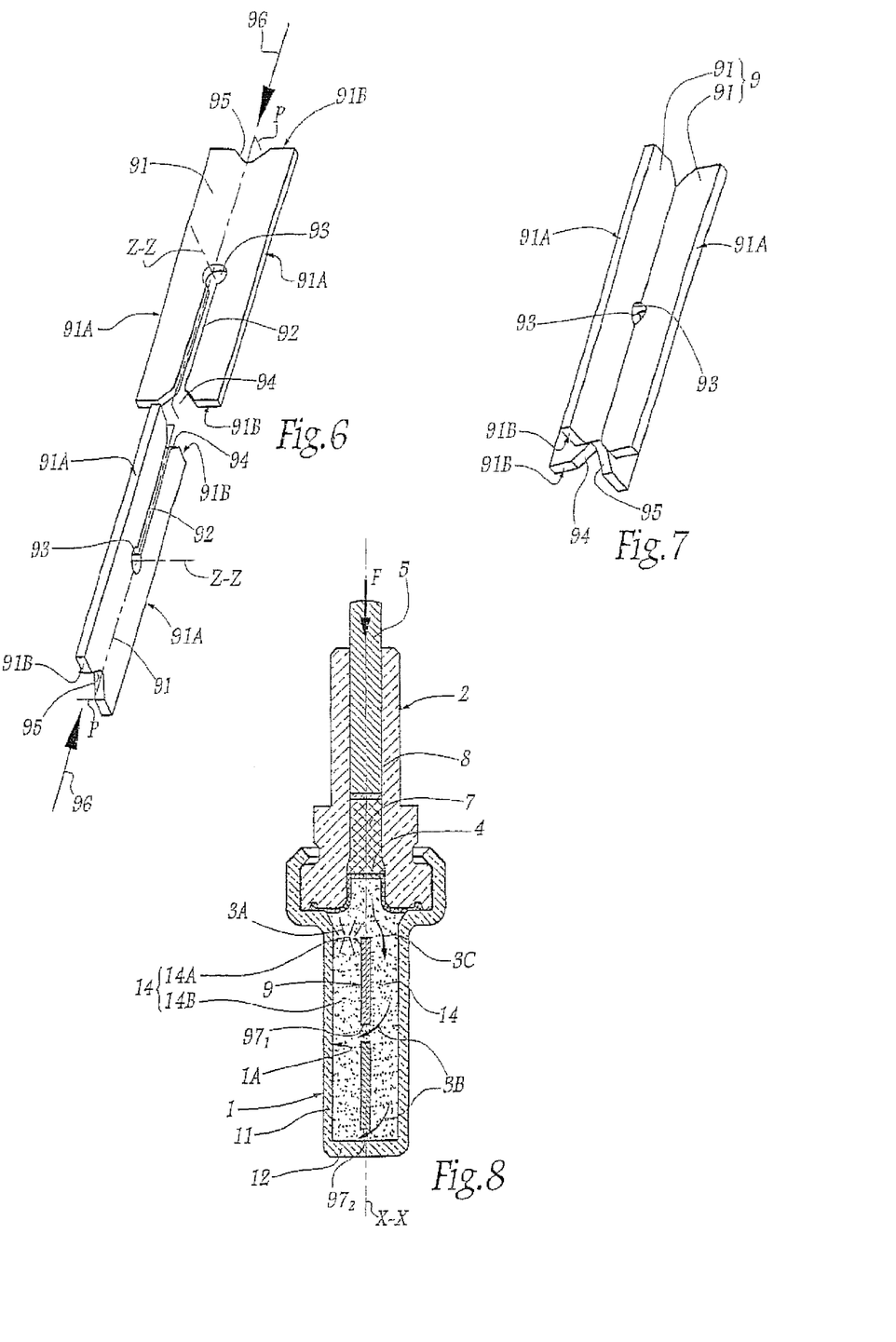
FIG. 6 is an exploded view in perspective of an internal member of the element of FIG. 3.
FIG. 7 is a view in perspective of the member of FIG. 6, represented in the assembled state.
FIG. 8 is a view similar to FIG. 3, illustrating an operating state of the element.
Figure 9:
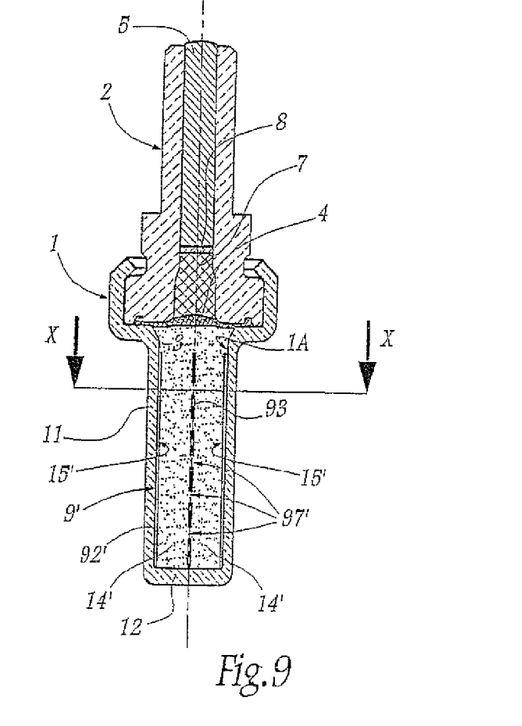
FIGS. 9 to 11 are views similar to FIGS. 3 to 5, of a second embodiment of a thermostatic element according to the invention, the planes marked IX-IX and XI-XI of FIG. 10 corresponding respectively to the sectional plane of FIGS. 9 and 11 while the plane X-X in FIG. 9 corresponds to the sectional plane of FIG. 10.

Each plate 91 has a length that is slightly less than that of the tubular portion 11 of the cup 1, while its width, that is to say the dimension separating the two lateral sides 91A, is substantially equal to the internal diameter of this tubular portion.

Each plate 91 is furnished with a longitudinal through-slot 92 that extends along the plane of symmetry P, from one of the front sides 91B to midway along the length of the plate 91. On either side of the plane P, the edges of the slot 92 are separated by a distance that is substantially equal to the thickness of the plate 91.

At its longitudinal end situated midway along the plate 91, the slot 92 opens into a through-hole 93 that is central to the plate. This hole is of generally cylindrical shape with a circular base and an axis marked Z-Z. At its opposite end, the slot 92 opens onto the edge of the front side 91B forming a flared notch 94 substantially symmetrical relative to the plane P and convergent toward the unsupported portion of the slot.

At its front side 91B opposite to that furnished with the notch 94, each plate 91 has another front notch 95 substantially symmetrical to the notch 94 relative to a plane both perpendicular to the plane P and containing the axis Z-Z.

Each plate is manufactured in an economic manner, particularly by cutting a thin metal sheet.

The two plates 91 are suitable for being assembled together to form the insert 9, by positioning the unslotted half of each plate into the slot 92 of the other plate. In the assembled configuration of the plates 91, represented in FIG. 7, the two plates extend substantially perpendicularly to one another, forming, in cross section as in FIG. 4, a cross pattern with four branches orthogonal to one another.

The holes 93 made at the closed end of the slots of the two plates are then in communication with one another, their respective axis Z-Z extending perpendicularly to one another. Because of the dimensioning of these holes, each of the four quadrants of the cross pattern formed by the plates 91 is in free communication with the other three quadrants.

The two plates 91 are assembled together first by placing the two plates as in FIG. 6, that is to say with their respective planes P substantially perpendicular to one another and their front side 91B furnished with the notch 94 in line with one another. Then, by bringing the two plates 91 closer to one another in a direction parallel to their longitudinal direction, as indicated by the arrows 96 in FIG. 6, the slots 92 of the two plates penetrate one another, the flared shape of the notches 94 guiding the relative positioning of the two plates when the two plates begin to engage with one another. This relative nearing movement is continued until the respective axes Z-Z of the holes 93 intersect with one another, in a perpendicular manner. The front notch 94 made at the open end of the slot 92 of each of the plates is then situated at the same level as the notch 95 of the other plate, the end edges of the corresponding front sides 91B of each plate then being flush with one another. In a similar manner to the zone of intersection of the holes 93, each front zone of the intersection of the notches 94 and 95 places the four quadrants of the cross pattern formed by the plates 91 in free communication.

Figure 3:
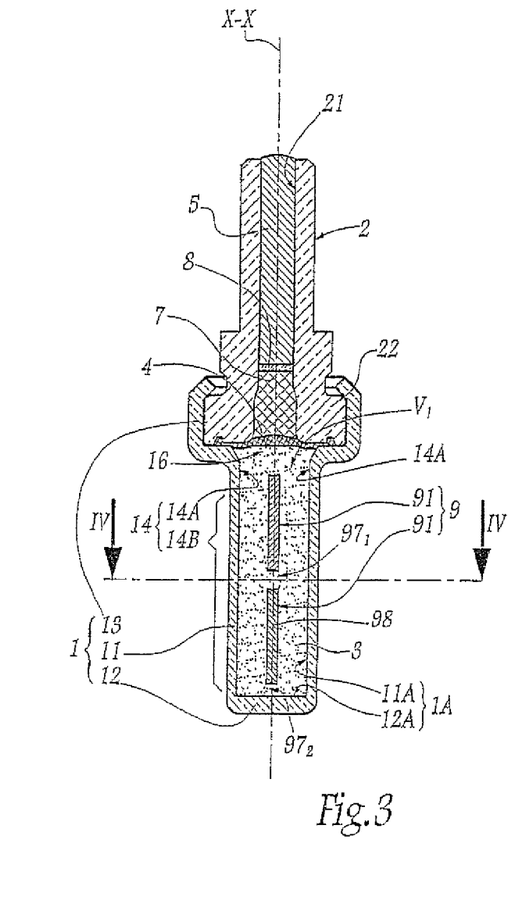
FIG. 3 is a view similar to FIG. 1, of a first embodiment of a thermostatic element according to the invention.
Figure 4:
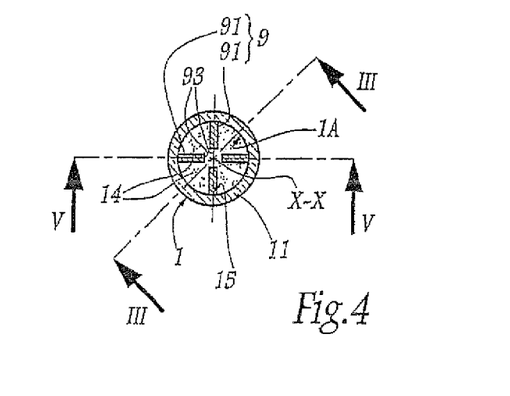
FIG. 4 is a cross section of the thermostatic element of FIG. 3 along the plane IV-IV of this figure, the plane III-III indicated in FIG. 4 corresponding to the sectional plane of FIG. 3.
Figure 5:
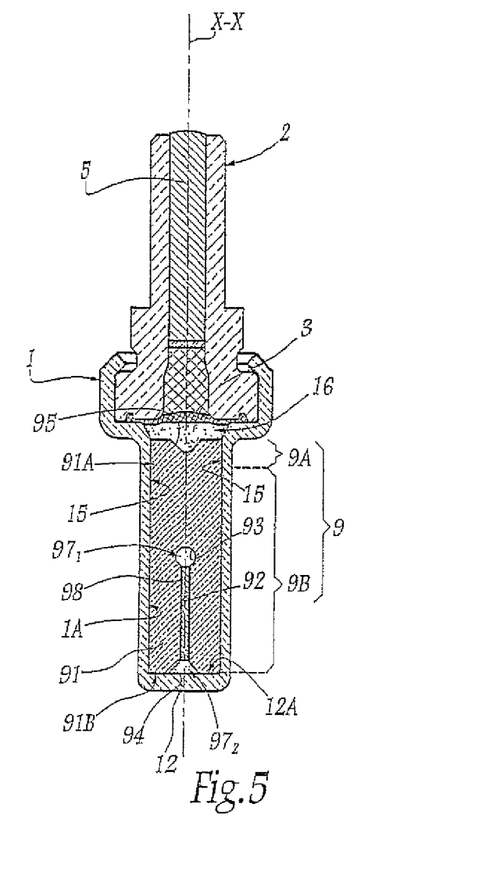
FIG. 5 is a longitudinal section of the element of FIG. 3, along the plane V-V of FIG. 4.

In its assembled configuration of FIG. 7, the insert 9, consisting of the two plates 91, is designed to be assembled to the cup 1 of FIGS. 3 to 5, by being inserted into the internal volume $V_1$ of the cup so that its longitudinal direction extends parallel to the axis X-X of the cup 1, then by being welded to the inner face 1A of this cup. More precisely, the insert 9 is fitted to the inside of the cup 1 so that the unslotted portions 98 of the plates, positioned respectively between the edges of the slot 92 of the other plate, extend in the extension of one another, substantially in line with the axis X-X of the cup 1. For convenience, the rest of the description will be oriented so that the terms "upper" and "top" indicate a direction directed toward the top portion of FIGS. 3, 5 and 8, while the terms "lower" and "bottom" correspond to an opposite direction, the axis X-X therefore extending in a substantially vertical direction in the aforementioned figures. Accordingly, the insert 9 is fitted to the inside of the cup 1 in a vertical movement, oriented from top to bottom.

Assembling the insert 9 into the cup 1 results in:
the two bottom front sides 91B of the plates 91 being in contact with the upper face 12A of the bottom wall 12 of the cup, and
the four lateral sides 91A of the plates 91 being in contact with the inner face 11A of the tubular portion 11 of the cup.

Accordingly, the plates 91 are in contact with the inner face 1A of the cup 1 in four distinct zones referenced 15 in FIG. 4. Since the length of the insert 9 is slightly less than that of the tubular portion 11 of the cup 1, the upper front end portion 9A of the insert 9, consisting of the two upper front sides 91B of the plates 91, is axially distant from the diaphragm 4, while delimiting a volumetric zone 16 of the top portion of the internal volume $V_1$ of the cup, axially situated approximately at the lower base of the collar 13.

The wax 3 contained in the cup 1 is therefore stored, on the one hand, in the volumetric zone 16 and, on the other hand, in four longitudinal cavities 14 delimited by the insert 9 and the cup 1, in the four quadrants of the cross pattern formed by the plates 91 of this insert. More precisely, the insert 9 divides the bottom portion of the internal volume $V_1$ of the cup 1 into these four cavities 14 distributed uniformly about the axis X-X and having, in cross section as in FIG. 4, a profile like a portion of a circle with an apex angle of 90° approximately. Each cavity 14 extends lengthwise over substantially the whole length of the tubular portion 11 of the cup 1, while being closed at its lower end by the bottom wall 12 while it opens, at its upper end, into the volumetric zone 16. The outlets 14A of the cavities are therefore delimited by the upper front end portion 9A of the insert, the rest of the insert, situated beneath these outlets, being marked 9B in the figures.

Advantageously, more than 80%, even 90%, of the wax 3 is therefore stored in the four cavities 14.

The metal insert 9 is connected in a fixed manner to the inner face 1A of the cup 1, while being welded to this face along the zones of contact 15. Therefore, the bottom portion 9B of the insert isolates the bottom portions 14B of the cavities 14 from one another, except at the two openings $97_1$ and $97_2$, delimited respectively exclusively by the plates 91, in the zone of intersection of their hole 93, and jointly by the plates 91, at the zone of intersection of their lower notch 94 and 95, and the upper face 12A of the bottom wall 12 of the cup 1. Therefore, outside the upper volumetric zone 16, the cavities 14 are in free fluidic communication with one another via these openings $97_1$ and $97_2$ through which the wax 3 can pass freely.

In operation, when the thermostatic element of FIGS. 3 to 5 passes from a first state called "cold", in which its wax 3 has an even temperature equal to the temperature of an external environment, such as mixed water coming out of a mixer faucet cartridge, to a heated state resulting from a sudden increase in the temperature of this external environment, a thermal flux occurs from the external environment to the cup 1, then from the cup 1 to the heat-expandable wax 3, until, after a certain period, the thermostatic element, in particular its wax 3, reaches an even temperature equal to the new heated temperature of the external environment. More precisely, the heat travels very rapidly into all the metal of the cup 1, particularly up to its inner wall 1A partly delimiting the internal cavities 14, and into all the metal of the insert 9, the welds of this insert to the inner face 1A of the cup forming thermal continuities between the cup 1 and the insert 9. This insert therefore plays the role of a radiator for conducting the heat between the cup and the wax contained in the cavities 14.

The temperature of the wax 3 having increased, the wax expands and, since the cup 1/sheath 2 assembly is not deformable, the wax 3 deforms, while expanding, the diaphragm 4, which, for its part, deforms the pad 7, the latter moving in translation the shim 8 and the piston 5 in the channel 21 of the sheath. Thus, an increase in the temperature of the external environment causes the piston 5 to move out of the sheath 2, in the direction X-X, after a given period, called in practice the "response time". The greater the thermal flux toward the wax 3, the shorter this response time, hence the value of the cross shape with branches orthogonal to one another of the internal radiator 9 and of the resulting division of the internal volume $V_1$ of the cup into the four cavities 14. Specifically, this thermal flux increases with the value of the surface area of contact between the wax 3 and the heated metal of the cup 1 and of the radiator 9, while it diminishes with the maximum distance, in cross section, between any particle of the wax and these metal walls.

In addition, creating the radiator 9 with the slotted plates 91 assembled together makes it possible to have particularly thin metal walls delimiting the cavities 14, which optimizes the response time of the thermostatic element since, because of its low weight, the radiator 9 requires only a small quantity of energy and therefore time to be heated.

The operation described above is reversible when the temperature of the external environment reduces. In this case, the thermostatic element contracts passing from a temperature in which the wax 3 is expanded in a viscous, or even liquid, state as shown in FIG. 8, to a lower temperature for which the wax 3 is contracted in a more viscous, or even solid, state as in FIGS. 3 to 5. The majority of the wax mass 3 situated in the zone 16, that is to say situated between the diaphragm 4 and the radiator 9, then enters the cavities 14 under the action of the force of pressure F generated by the load of the piston 5 pushed in practice by return means not shown, outside of the thermostatic element. The force of pressure F is transmitted to the wax 3 by means of the pad 7 and the diaphragm 4 when the piston 5 retracts into the sheath 2.

However, in certain cases, particularly after multiple heating/cooling operating cycles, the wax 3 often has difficulties, during the cooling phase of the thermostatic element, in penetrating the cavities 14 at their outlet 14A. As explained in detail in the introductory portion of the present document, the outlet 14A of one of the cavities 14 may in effect be blocked, as indicated by the arrows 3A for the cavity represented in the left portion of FIG. 8. In this case, wax 3 originating from the other three cavities 14 then passes through the openings $97_1$ and $97_2$, as indicated by the arrows 3B, to fill the cavity whose outlet is blocked. The wax that passes through these openings is moved under the effect of the force of pressure F of the piston 5, transmitted by the wax contained in the volumetric zone 16, which therefore withdraws into the three cavities 14 that are not blocked, including the cavity represented in the right-hand portion of FIG. 8, as indicated by the arrow 3C.

The embodiment of FIGS. 9 to 12 differs essentially from that of FIGS. 3 to 8 in its metal radiator 9' which, although having a similar function to the radiator 9 of the embodiment of FIGS. 3 to 8, has a different structure. Unlike the insert 9 consisting of the two plates 91 assembled together, the radiator 9' consists of a single part, namely a wavy metal plate 91' shown alone in FIG. 12. This plate has a longitudinal axis of symmetry, indistinguishable from the axis X-X in FIGS. 9 to 11. In cross section as in FIG. 10, the plate 91' has a generally S-shaped section. When the radiator 9' is assembled to the cup 1 of the thermostatic element, the two symmetrical curved end portions 92' of the plate 91 are in contact with the inner face 1A of this cup, in two diametrically opposed contact zones 15', supported by the inner face 11A of the tubular portion 11 of the cup. The insert 9' is welded to the cup 1 at these contact zones 15'.

Figure 10:
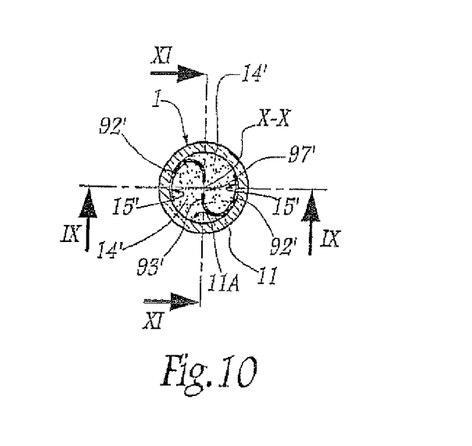
Figure 11:
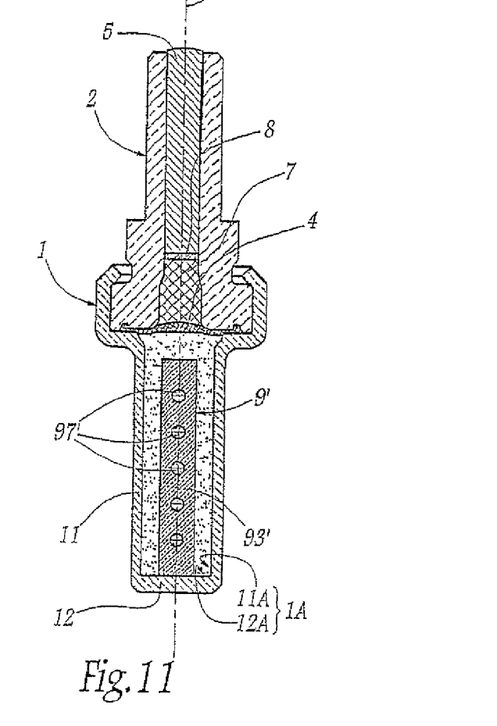
Figure 12:
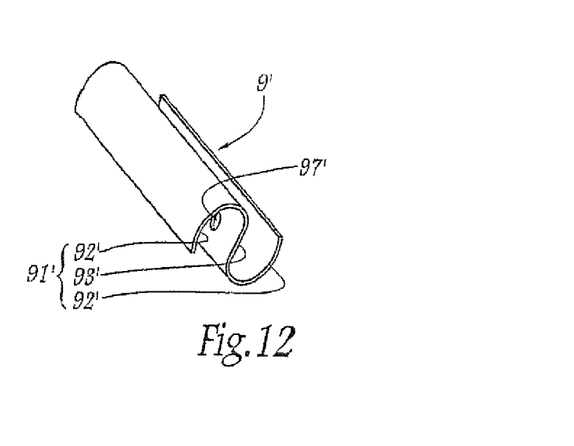
FIG. 12 is a view in perspective of an internal member of the element of FIG. 9, this member having a function similar to that of the member represented in FIG. 7.

The intermediate portion 93' of the plate 91, from which the curved end portions 92' extend laterally, is substantially flat, extending in a diametral plane of the cup 1 corresponding substantially to the sectional plane of FIG. 11. This intermediate portion 93' delimits, on its own, five through-holes 97' distributed uniformly in the longitudinal direction of the portion 93' and constituting openings for the wax 3 to pass through on either side of the plate 91, functionally similar to the openings $97_1$ and $97_2$ described above. The two cavities 14' delimited on either side of the plate 91' are therefore in free fluidic communication in their bottom portion, that is to say opposite to the piston 5, through these openings 97'.

Figure 13:
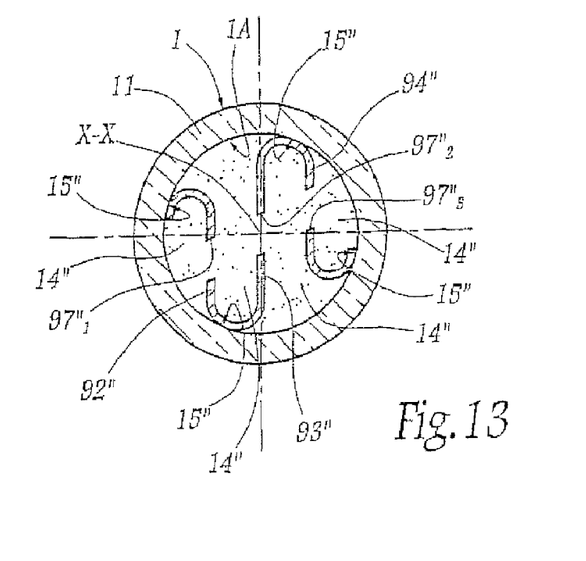
FIGS. 13 and 14 are views respectively similar to FIGS. 10 and 12, illustrating a variant of the second embodiment according to the invention.
Figure 14:
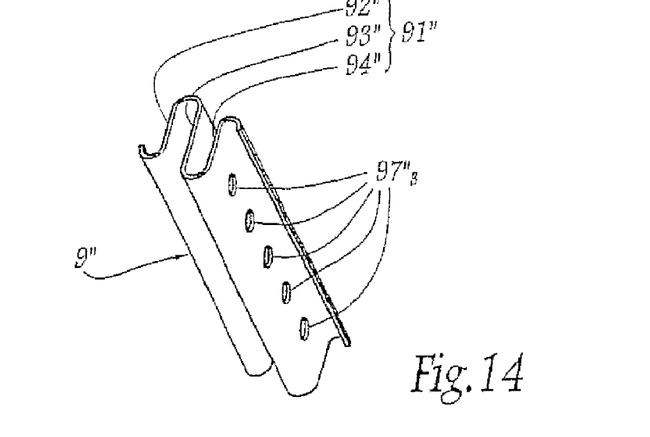

The embodiment of the FIGS. 13 and 14 is a variant of that of FIGS. 9 to 12 and differs from the latter only in the geometry of its internal radiator 9". In cross section, as shown in FIG. 13, this insert 9" is generally N-shaped. More precisely, the wavy metal plate 91" forming the radiator 9" comprises successively:

a first wall 92" having a generally S-shaped cross section, of which a first lateral end portion is welded to the inner face 1A of the cup 1 in a contact zone 15", while the opposite end portion is welded to this face 1A in another contact zone 15", the intermediate portion of the wall 92" delimiting openings $97"_1$ that pass right through this wall;

a second wall 93" having a generally S-shaped cross section, of which a first lateral end portion consists of the aforementioned second end portion of the wall 92", while the opposite end portion is welded to the inner wall 1A of the cup 1 in a third contact zone 15", the intermediate portion of this wall 93" delimiting openings $97"_2$ that pass right through the wall; and a third wall 94", also with a generally S-shaped cross section, of which a lateral end portion consists of the aforementioned second end portion of the wall 93", while the opposite end portion is welded to the inner face 1A of the cup 1 in a fourth contact zone 15", the intermediate portion of this wall 94" also being pierced by through-holes $97"_3$.

The geometry of the insert 9" makes it possible to delimit, with the inner face 1A of the cup 1, four cavities 14" for storing the wax 3, functionally similar to the aforementioned cavities 14 and 14'. In their portion opposite to the piston 5, each cavity 14' is in free fluidic communication with at least one other of the cavities 14", through the openings $97"_1$, $97"_2$ and $97"_3$.

Various arrangements and variants of the thermostatic elements described above can naturally be envisaged:

it is possible to provide in particular embodiments having different dimensions, appropriate to the specific application of the thermostatic element;

similarly, very diverse shapes of cavity for storing the wax are possible, resulting from the various geometries of the internal radiator that can be envisaged, whose slotted plates positioned in one another may be for example curved, and/or resulting from various geometries of the cup, whose lateral outer face may have flats, depressions and/or bulges or else whose length may be shorter than the diameter;

rather than having the radiator welded into the cup of the thermostatic element, this radiator may be made of the same material and in one piece with the inner face of the cup; and/or although the examples envisaged above include several through-openings for the wax 3 between the cavities delimited in the cup 1, only one opening of this type may be sufficient to prevent the risks of blocking of the wax 3 at the outlet of these cavities, this single opening being just as able to be situated in the unsupported portion of the radiator, like the openings $97_1$, $97'$ or $97''_1$, $97''_2$ and $97''_3$, as at its end opposite to the piston 5, that is to say close to the bottom wall 12 of the cup, like the opening $97_2$.

The invention claimed is:

1. A thermally activated fluid flow controller for controlling the temperature of a mixing of fluids flowing through the flow controller, the flow controller comprising a thermostatic element including, an outer imperforate metal cup having an internal volume which contains a material that expands and contracts according to variations of its temperature, the internal volume including a volumetric zone and at least two separate cavities, each having an opening in open communication with the volumetric zone so that the material passes between the volumetric zone and the at least two separate cavities through the openings when the material expands and contracts, dividing means for dividing the internal volume into the at least two separate cavities, a piston reciprocally movable relative to the outer imperforate metal cup in an axial direction of the outer imperforate metal cup and wherein the piston is coupled to the expandable and contractile material on an opposite side of the volumetric zone from the at least two separate cavities in order to move in opposite directions depending on whether the material expands or contracts, the dividing means having at least one through opening of a size for the material to pass directly between the at least two cavities, such that during retraction of the piston when the material contracts, the material passes through the at least one through opening from one of the at least two cavities to the other of the at least two cavities under the effect of the pressure generated by a force of the piston on the material contained in the volumetric zone.

2. The thermally activated fluid flow controller as claimed in claim 1, wherein the at least one through opening is only in the dividing means.

3. The thermally activated fluid flow controller as claimed in claim 1, wherein at least one through opening is created between the dividing means and an inner face of the outer imperforate metal cup.

4. The thermally activated fluid flow controller as claimed in claim 1, wherein the dividing means extends in a direction substantially parallel to a longitudinal axis of the outer imperforate metal cup, and a plurality of through openings are distributed along a length of the dividing means.

5. The thermally activated fluid flow controller as claimed in claim 1, wherein the at least one through opening is provided at an end of the dividing means opposite to the piston.

6. The thermally activated fluid flow controller as claimed in claim 1, wherein the dividing means is a metal radiator for conducting heat between the outer imperforate metal cup and the expandable and contractible material within the at least two cavities.

7. The thermally activated fluid flow controller as claimed in claim 6, wherein the radiator includes at least one metal wall that contacts an inner face of the outer imperforate metal cup at two locations, and the at least one through opening passing through the wall.

8. The thermally activated fluid flow controller as claimed in claim 6 wherein the radiator includes at least two parts assembled together.

9. The thermally activated fluid flow controller as claimed in claim 6, wherein the radiator is a single part having, in cross section relative to a longitudinal axis of the outer imperforate metal cup, a generally S-shaped configuration.

10. The thermally activated fluid flow controller as claimed in claim 6, wherein the radiator is welded to an inner face of the outer imperforate metal cup.

11. The thermally activated fluid flow controller as claimed in claim 6, wherein the radiator includes at least two partially slotted metal plates each in contact with an inner face of the outer imperforate metal cup and assembled together by placing an un-slotted portion of each plate in a slot of the other plate, and wherein the at least one through opening is defined by a portion of at least one of the slots of the plates.

12. The thermally activated fluid flow controller as claimed in claim 1, wherein the outer imperforate metal cup includes, along a direction of a longitudinal axis thereof, a tubular wall terminating at a bottom end and an having an inner face connected at least two separate zones by the dividing means to thereby create the at least two cavities opposite to the piston, and the piston being positioned withing a collar portion of the outer imperforate metal cup extending opposite the bottom end.

13. A thermostatic cartridge including a thermally activated fluid flow controller according to claim 1.

14. Thermostatic faucet including a thermally activated fluid flow controller according to claim 1.

15. The thermally activated fluid flow controller as claimed in claim 6, wherein the radiator is a single part having, in cross section relative to a longitudinal axis of the outer imperforate metal cup, a generally N-shaped configuration.

* * * * *